United States Patent [19]
Wemhöner et al.

[11] Patent Number: 6,103,012
[45] Date of Patent: Aug. 15, 2000

[54] COATING PRESS

[75] Inventors: Heinrich Wemhöner, Herford; Christian Linhorst, Werther; Ludwig Müsse, Horn-Bad Meinberg, all of Germany

[73] Assignee: Heinrich Wemhoener GmbH & Co. KG Maschinenfabrik, Herford, Germany

[21] Appl. No.: 09/161,195

[22] Filed: Sep. 25, 1998

Related U.S. Application Data

[63] Continuation of application No. PCT/DE97/00544, Mar. 18, 1997.

[51] Int. Cl.[7] .................................................. B05C 13/02
[52] U.S. Cl. ........................ 118/500; 156/212; 156/360; 156/475; 100/295; 100/297; 269/21
[58] Field of Search ............................. 118/500; 269/21; 100/295, 299; 156/212, 360, 475

[56] References Cited

U.S. PATENT DOCUMENTS 5,120,033  6/1992  Shoda ........................................ 269/21

FOREIGN PATENT DOCUMENTS 0678357  10/1995  European Pat. Off. .

*Primary Examiner*—Laura Edwards
*Attorney, Agent, or Firm*—Herbert L. Lerner; Laurence A. Greenberg; Werner H. Stemer

[57] ABSTRACT

A coating press for multi-face foil coating of work pieces, includes a work table for receiving work pieces that are to be coated. The work table has a table plate with grid-shaped through holes formed therein and the table plate has a top surface. A bottom press plate is provided for supporting the work table. There is a tray carriage which receives the work table and introduces the work table into the coating press. There are carrier elements having footing faces movably disposed in the through holes. The carrier elements receive and support the work pieces. Each of the carrier elements are reversibly variable in length between an extended position and a non-extended position. The carrier elements fully covered by the work pieces are in the extended position standing on the footing faces on the bottom press plate and extend above the top surface of the table plate for raising the work pieces above a level of the table plate. The carrier elements not covered or partially covered by the work pieces are put in the non-extended position.

26 Claims, 8 Drawing Sheets

COATING PRESS

CROSS-REFERENCE TO RELATED APPLICATION

This is a continuation of International Application PCT/DE97/00544, filed on Mar. 18, 1997, which designated the United States.

BACKGROUND OF THE INVENTION

Field of the Invention

The present invention relates to a coating press for multi-face foil coating of work pieces. The coating press includes a work table loaded with the work pieces. The work table is introduced into the coating press on a tray carriage and is supported on a bottom press plate in the coating press.

Presses used for simultaneously coating flat work pieces such as furniture boards on one of its surfaces and all of its marginal edges are known in the art. In such presses, the work pieces are placed on bases. The bases are disposed on a bottom press plate and the edges of the bases are set back relative to the edges of the work piece. In this manner, foil fed from above will encompass the work piece surface and the marginal edges of the work piece under the action of positive pressure applied from above and/or negative pressure applied from the bottom. This implies that a size-adapted base must be provided for any and each particular work piece and therefore bases must be kept in stock and be available on short call. In addition, the bases need to be manually installed which results in unnecessary handling time and expense, and which may give rise to errors and malfunctions.

A press with a support system for plate-shaped work pieces is known from German Utility Model DE 295 00 248 U. The support system has work piece support plugs. The support plugs are taken from receiving holes in a plug plate and then inserted into adjacent plug holes in conformity with a predetermined loading pattern in such a way that a work piece may be placed thereon and raised relative to said plug plate.

Such a support system has the drawback that a loading pattern conforming to the work pieces needs to be calculated for each press cycle. However, when it is discovered on the upstream side of the press that an uncoated work piece is for instance missing or defective, then a work piece of identical size must be used as a substitute. This is often impossible because the storage yard and the processing area are arranged in different locations resulting in waiting and production outage times. Loading smaller-sized work pieces is not desirous because unoccupied support plugs might impede the complete coating of the side faces. Loading a larger work piece involves the risk that the work piece is inadequately supported and that unsupported areas might break off due to the high pressures per unit area that prevail inside of the press.

SUMMARY OF THE INVENTION

It is accordingly an object of the invention to provide a coating press which overcomes the hereinafore-mentioned disadvantages of the heretofore-known devices of this general type, and which provides multi-face foil coating wherein the loading of a work table with work pieces may be effected independently of any predetermined loading pattern and irrespective of the specific size of the work pieces so that the loading operation may be simplified and accelerated. In addition, substantially large-area support is given to the work pieces to minimize the risk of fracture of the work pieces.

With the foregoing and other objects in view there is provided, in accordance with the invention, a coating press for multi-face foil coating of work pieces, including: a work table for receiving work pieces to be coated, the work table has a table plate with grid-shaped through holes formed therein, the table plate has a top surface; a bottom press plate for supporting the work table; a tray carriage for receiving the work table and introducing the work table to the bottom press plate; and carrier elements having footing faces movably disposed in the through holes, the carrier elements receive and support the work pieces, each of the carrier elements are reversibly variable in length between an extended position and a non-extended position, the carrier elements fully covered by the work pieces are put in the extended position standing on their footing faces on the bottom press plate and extend above the top surface of the table plate for raising the work pieces above a level of the table plate, the carrier elements not covered and partially covered by the work pieces are put in the non-extended position.

The object is achieved with carrier elements inserted in the through holes of the table plate. The table plate is preferably provided in the form of a grate or a plate having grid like openings. The carrier elements can be extended and retracted or shortened in such a way that in the extended position they extend above the plane support face of the table plate. The carrier elements protruding upwardly from the table plate are used to raise and support the work pieces resting thereon. Only the carrier elements which are entirely covered up by the work pieces get extended. In this manner, it is assured that all marginal edges of the work piece and part of its underside within the marginal edge area are exposed and that a foil can be pulled over and/or pressed to the surface, the marginal edges and the small marginal area of the underside of the work piece.

The solution according to the invention eliminates the need for providing bases of different sizes for differently dimensioned work pieces. This is possible because the base is now composed of a plurality of small carrier elements which are permanently available in the work table and which are only activated, i.e. extended, when required. Carrier elements that are not covered or are just partially covered up by the work piece(s) will remain in the retracted (non-extended) or shortened position. Another advantage is that the work table can be randomly loaded with work pieces in any desired configuration in the absence of any predetermined loading pattern because the length adjustment of the carrier elements projecting above the surface of the work table is not effected until after the loading of the work table. Computer use is not precluded so that performance to a pre-calculated optimized loading pattern is also practicable and the adjustments of the carrier elements can be effected before the start of the loading operation.

In accordance with an added feature of the invention, the carrier elements each have an upper carrier plate with a cross-section larger than a cross section of the through holes, the upper carrier plate has an under side and the under side of the upper carrier plate resides on the top surface of the table plate when the work table is outside of the coating press.

In accordance with another feature of the invention, the upper carrier plate has a square shape with one of rounded and chamfered edges, the carrier elements are disposed in the table plate wherein the upper carrier plate edges are relatively aligned with neighboring upper carrier plates and juxtaposed with play between neighboring upper carrier plates for defining a plane surface having free spaces, the free spaces are formed at least in corner areas defined by an intersection of the corners of neighboring carrier plates, the free spaces being uncovered free spaces aligned over the through holes.

A particularly preferred embodiment of the invention provides for each of the carrier elements to be configured with an upper carrier plate which is wider than the through holes and which is in contact with the work table top on its underside. This substantially increases the work piece supporting area. The carrier elements and/or carrier plates are preferably of square shape and relatively aligned by their edges. The edges as such are either rounded or provided with a chamfer so that a table plate area confined by the carrier elements and/or the carrier plate marginal edges remains vacant even when the carrier elements or carrier plates are closely aligned together.

In accordance with an additional feature of the invention, there are sensors or component parts thereof disposed around the carrier elements and aligned with the free spaces for detecting work pieces lying on the work table, the table plate, and the carrier elements.

In accordance with yet another added feature of the invention, the sensors and the component parts thereof have windows and the windows are disposed in the table plate. The vacant area is preferably aligned with sensors or components thereof such as windows or lenses for light transmission in the work table through holes therebeneath or adapted as free measuring apertures to detect a loaded work piece by optical distance measurement.

In accordance with yet another additional feature of the invention, the extension of the carrier elements from the non-extended position to the extended position can be accomplished manually, semi-automatically and fully automatically. This is accomplishable in a variety of technical approaches. For instance, a screwed two-part carrier element by screwing in or unscrewing one of the parts is possible. In the case of other types of two-part carrier elements such techniques as clamping, under shifting, tilting, telescoping, etc. can be used. In the case of a one-piece carrier element, for instance a parallelepiped carrier element, such a length variation or extension is achievable by simply turning the element over and/or posting it on a different side face. Such a retracting or shortening effect can also be produced by making a one-piece carrier element swingable about a pivot point which is arranged at different spacings from two plane work piece support faces.

In accordance with yet another additional feature of the invention, there are extension members having rocker arms, the rocker arms are connected to the carrier elements, each of the extension members is swingable into a position beneath a thus extended carrier element and a position beside a thus non-extended carrier element.

In accordance with a further added feature of the invention, there is a carrier arm having a catch, and the extension members each having a catch for temporary engagement with the catch of the carrier arm for extending the carrier elements to the extended position.

The preferred embodiment includes a rocker arm linked to the carrier element at one end of which an extension member is fitted to thereby make the extension member swingable from a position aside the carrier element into a position beneath the carrier element in which it has a large-area contact with the bottom face end of the carrier element to provide a stable mechanical extension thereof in the direction of vertical pressure application. This has the advantage that when the pivot has ample radial play in regards to the carrier element, transmission of the compressive force of the press is effected positively from the extension member to the carrier element rather than through the joint.

In a first embodiment of the invention, the underside of the extension member is fitted with the catch adapted to cooperate with the catch of the carrier arm to ensure and improve the functional performance of the system. The carrier arm is shown in one embodiment of the invention and is preferably disposed on the measuring carriage of the setup station and the measuring carriage is shiftably disposed beneath a tray carriage. The measuring carriage is configured to lift or lower the carrier arm through an actuator provided in the form of the lifting cylinder. When in a raised position, the catch of the carrier arm engages into the catch of the extension member in such a way that advancing the measuring carriage makes the extension member swing from a substantially horizontal position aside the carrier element into a vertical position beneath the element about a carrier-mounted joint or pivot point. This type of carrier element extension is very simple in construction from a mechanical point of view and extremely stable and resistant to the vertical compressive forces involved. The reverse operation to shorten the carrier elements is effected simply by swinging back the extension members, for instance by use of a beam which is movable along the table plate at the underside thereof, to restore the extension members to their position aside the carrier elements.

The measuring carriage in the preferred embodiment of the present invention is fitted with a measuring wheel serving as position sensor and adapted to roll along the table plate on the underside thereof. Moreover, the measuring carriage is equipped with upwardly directed sensors which are capable of detecting work pieces resting on the carrier elements through the free areas or windows in the table plate. The size of the work piece, too, can be detected in coaction with the position sensor. The detection is preferably achieved by light-sensitive sensors and a light source disposed above the table plate level, by infrared distance measurement or by any other conventional techniques suitable for this purpose.

A second preferred embodiment of the invention includes an indicator and setback table disposed beneath the work table which is either liftable to a position in which all of the extended carrier elements can be raised to check for functional performance or loading pattern or which is liftable and lowerable in an offset lateral position. Magnetic tracks disposed line by line on the setback table attract the carrier extension members fitted with embedded aperture plates and turn them over into an extended home position. Subsequent backswings may be effected either with the aid of a measuring carriage again or a stationary measuring unit over which the work table passes on its way into the press.

It is a particular advantage to make the carrier plates thicker than the extension members are high because no gap will be created between any two adjacent and differently long carrier elements (only a step will occur if adjacent carrier plates are offset). In areas free from the work pieces this will permit to simulate so-called clamping ledges which for some particular work piece types are additionally placed underneath the press to stretch the foil and which need to be removed again and freed from the foil for reuse.

Another advantage resides in that a plurality of older press units can be readily retrofitted with the work table of the present invention and an appropriate device for detection of loaded work pieces. Such a device must not necessarily be disposed underneath the table plate, but might as well be adapted to detect work pieces from above. The press may also be in communication with a computer which calculates and/or establishes optimized loading patterns or by use of an associated work piece feeder, automatically loads the work table. In addition, it is possible to deactivate carrier element extension in selected sectors to conventionally place bases beneath the work pieces within the respective sector which may be necessary for work pieces of complex shape. An advantageous improvement of the inventive work piece support mode for use in continuous presses is as well imaginable.

In accordance with a further feature of the invention, the sensors are selected from the group consisting of optical sensors, electrical sensors and mechanical sensors.

In accordance with a further additional feature of the invention, the sensors form a detection system for detecting the work pieces lying on the table plate, the sensors provide signals for causing subsequent extension of the carrier elements in the non-extended position and retracting extended carrier elements to the non-extended position as necessary, the sensors of the detection system are disposed in a sector-wise distribution subdividing the table plate into sections and the detection system being controllable on a section by section basis for deactivating chosen sections.

In accordance with yet another added feature of the invention, there is a computer connected to the sensors, the computer calculates optimized work piece loading patterns, recognizes actual loading patterns and determines which of the carrier elements need to be put in the extended position.

In accordance with yet another additional feature of the invention, there is an automatic work piece loading device connected to and controlled by the computer for automatically loading the work table with the work pieces.

In accordance with yet another feature of the invention, the carrier plates of the carrier elements are thicker than the extension members are high and a lift stroke of the carrier element is large.

In accordance with an added feature of the invention, there is a setup station having sensors for detecting the work pieces and an actuating device, the setup station disposed underneath the tray carriage, the sensors having sensor windows disposed on one of the table plate and the carrier elements, the actuating device is movable underneath the tray carriage in parallel relation to the tray carriage and the actuating device has a carrier arm and a positioning device, the carrier arm is adjustable by the positioning device, the carrier arm engages and swings the extension members linked to the carrier elements through the rocker arms to beneath the carrier elements for putting the carrier elements in the extended position when a work piece is fully covering up a respective one of the carrier elements.

In accordance with another feature of the invention, the actuating device has a forward portion and a rear portion, the carrier arm is disposed in the forward portion and extends towards the rear portion, the carrier arm has an end with an upwardly directed catch, the positioning device is a lifting cylinder connected to the carrier arm, the carrier arm having the catch is movable from a lower position to a level of the extension members for a short-time engagement of the catch with the extension members for swinging the extension members downward from a lateral rest position during the advancement of the actuating device to the extension members.

In accordance with an additional feature of the invention, the setup system has a measuring carriage with a measuring wheel and a linear unit, the actuating device is disposed on the measuring carriage, the measuring carriage is shiftable on the linear unit, the measuring wheel has a circumferential shape adapted to a shape of an under side of the table plate, the actuating device equipped with the sensors for detecting table plate sections not loaded with the work pieces, the sensors detecting the works pieces on the table plate sections by one of simultaneously analysis and successive analysis of the table plate sections.

In accordance with yet another added feature of the invention, the catch of the of the carrier arm is formed of magnets and magnetic material.

In accordance with yet another feature of the invention, the extension members each have a plate strip disposed in an area of the footing faces, and the footing faces are directed downward if the extension members are in the non-extended position.

In accordance with yet another additional feature of the invention, there is a vertically and laterally shiftable indicator and setback table disposed underneath the work table, the indicator and setback table having column-disposed magnets with free interim spaces for supporting the extension members of extended carrier elements.

In accordance with a further added feature of the invention, there is a measuring device having sensors and a lifting cylinder, the carrier arm is disposed in the measuring device behind the sensors as viewed in a direction of movement of the carrier arm, the carrier arm connected to the lifting cylinder, the measuring device and the work table are movable relative to each other, the lifting cylinder lifting the carrier arm to a position adjacent to a rear side of the extension members for turning over sideways the extension members in the extended position to the non-extended position during a relative movement of the measuring device.

In accordance with a further addition feature of the invention, the carrier elements are configured as one-piece carrier elements each having at least two support faces, each of the at least two support faces can be selectively aligned to be parallel with the top surface of the table plate, the carrier elements protruding beyond the top surface of the table plate in at least one of the selected alignments.

In accordance with a further additional feature of the invention, the carrier elements have at least four parallel faces configured in pairs and disposed with different spacings from each other, and anyone of the at least four parallel faces can be alternatingly brought into parallel alignment with the top surface of the table plate.

In accordance with an added feature of the invention, the carrier elements are parallelepiped shaped.

In accordance with a concomitant feature of the invention, the carrier element is swingable about a pivot which is differently spaced from the support faces.

Other features which are considered as characteristic for the invention are set forth in the appended claims.

Although the invention is illustrated and described herein as embodied in a coating press, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
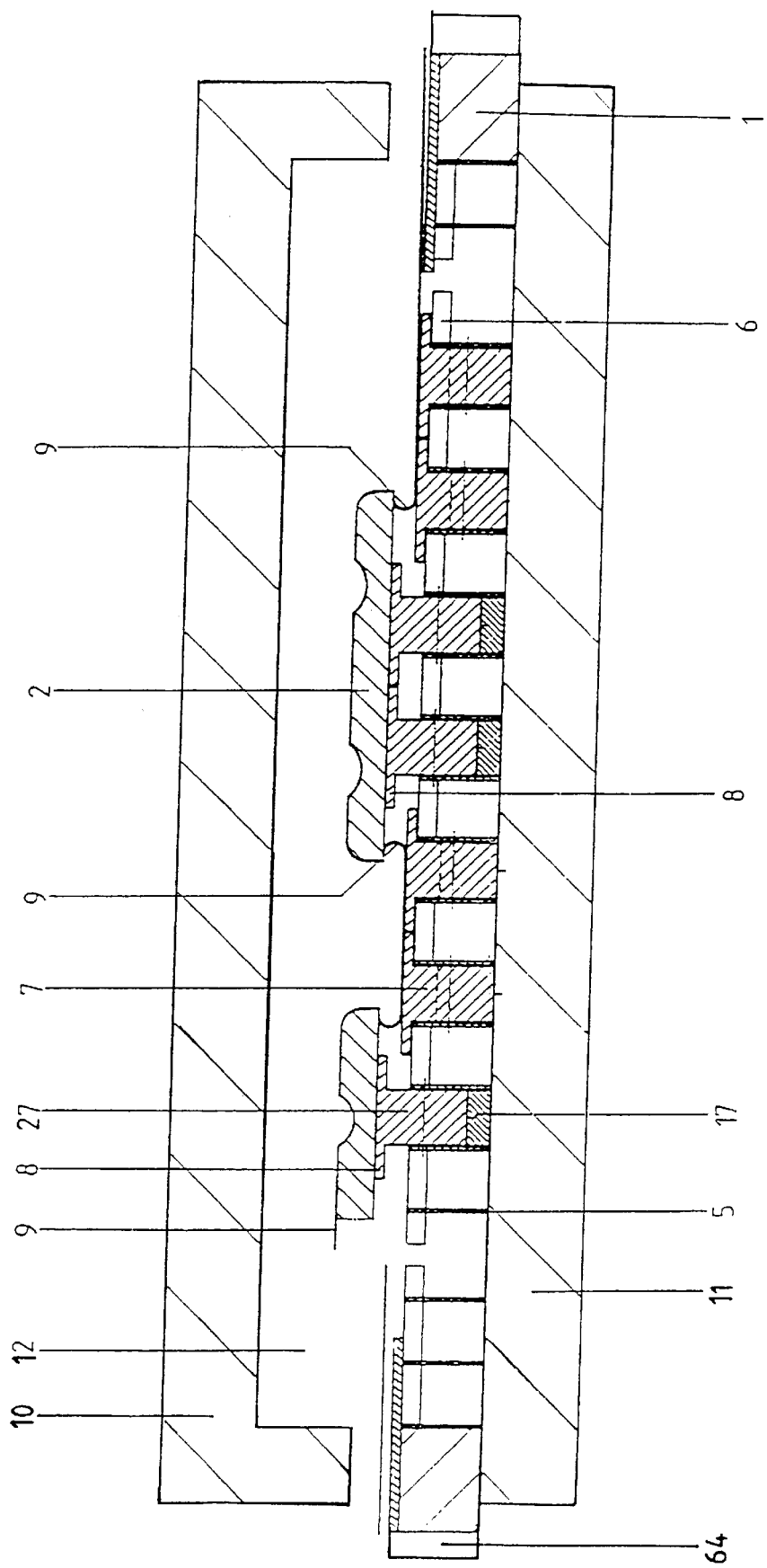
FIG. 1 is a sectional view of a first embodiment showing a work table disposed inside of a press.
Figure 2:
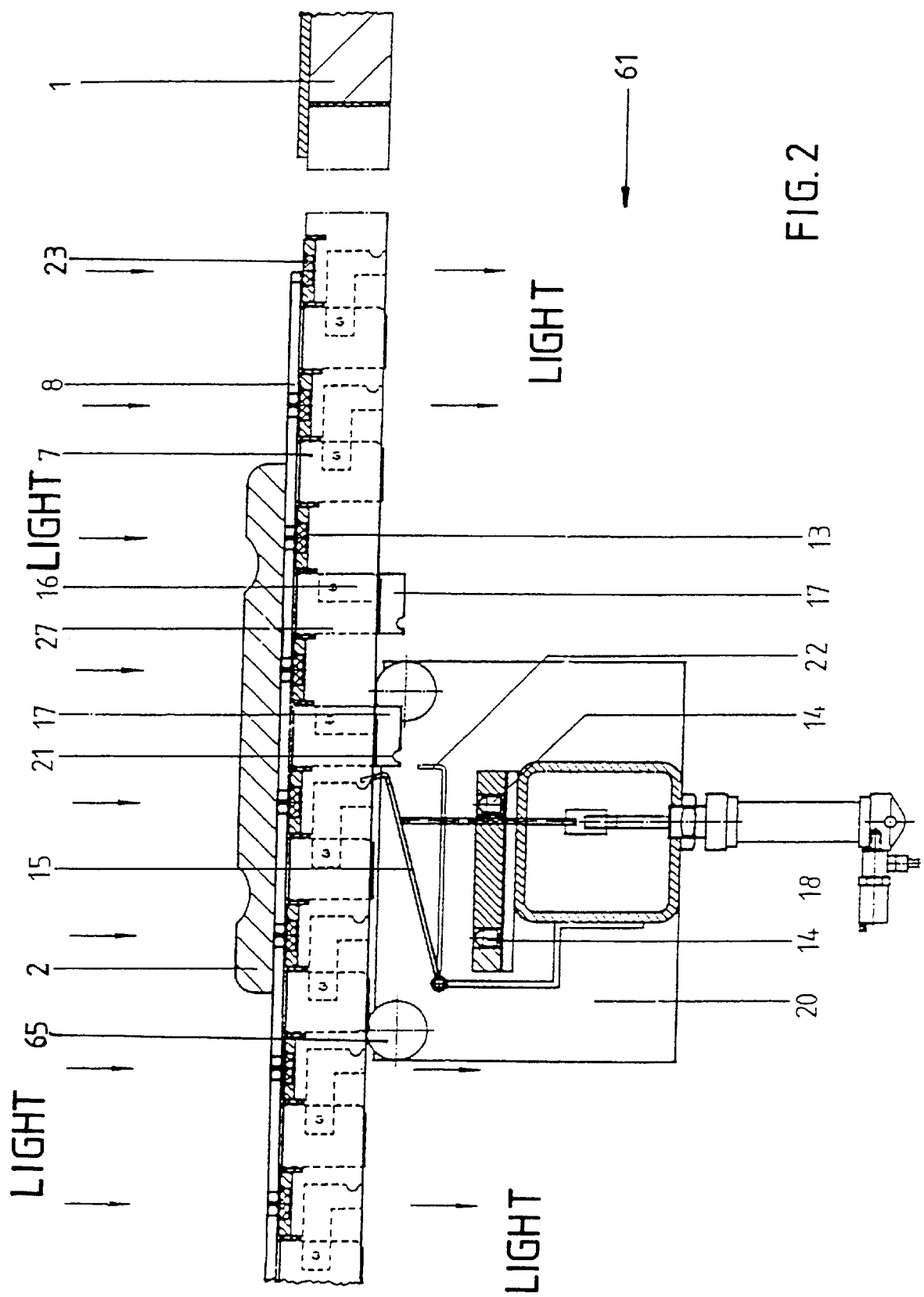
FIG. 2 is a sectional view of a setup station for the first embodiment.
Figure 3:
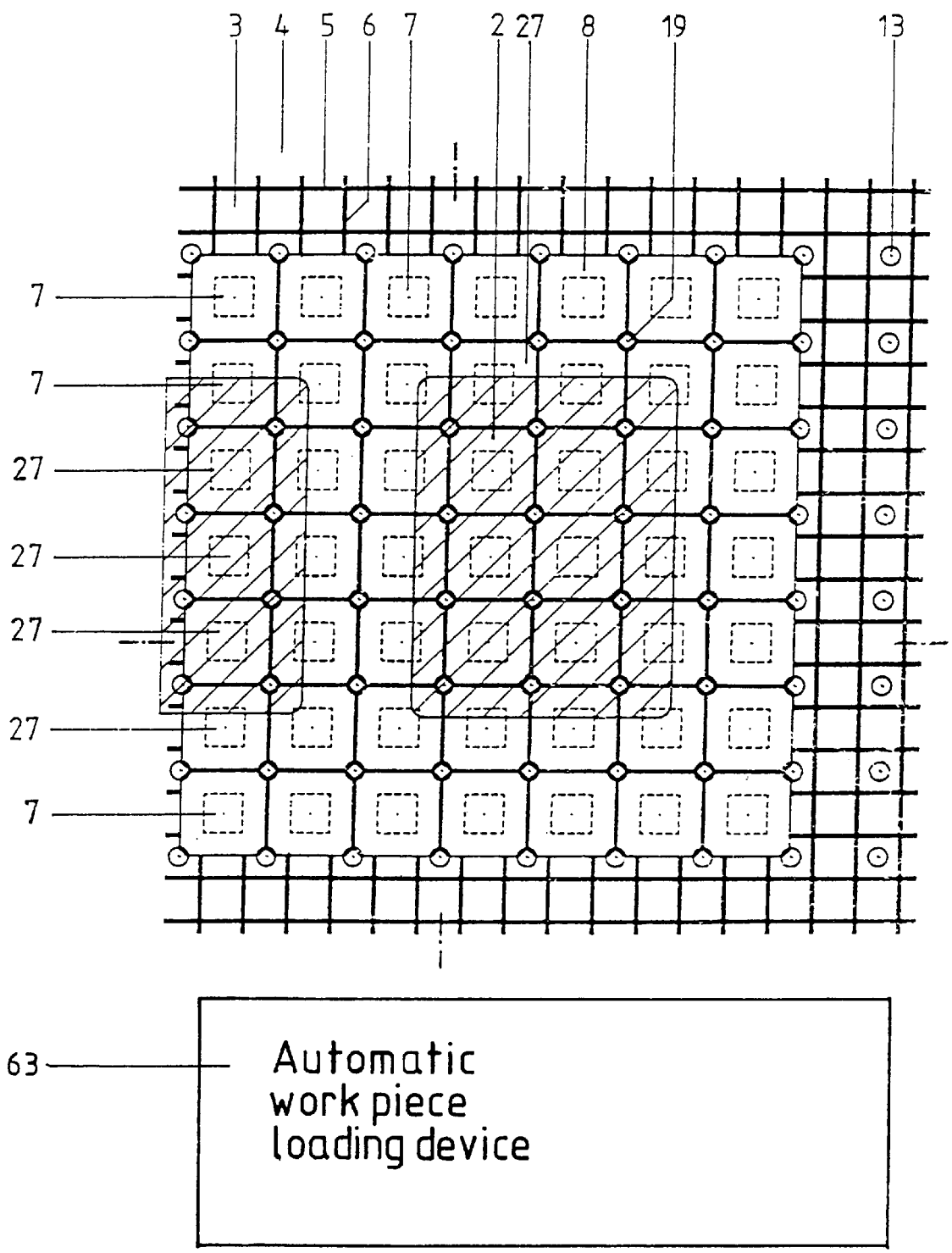
FIG. 3 is a fragmentary, top-plan view of the work table loaded with work pieces.
Figure 4:
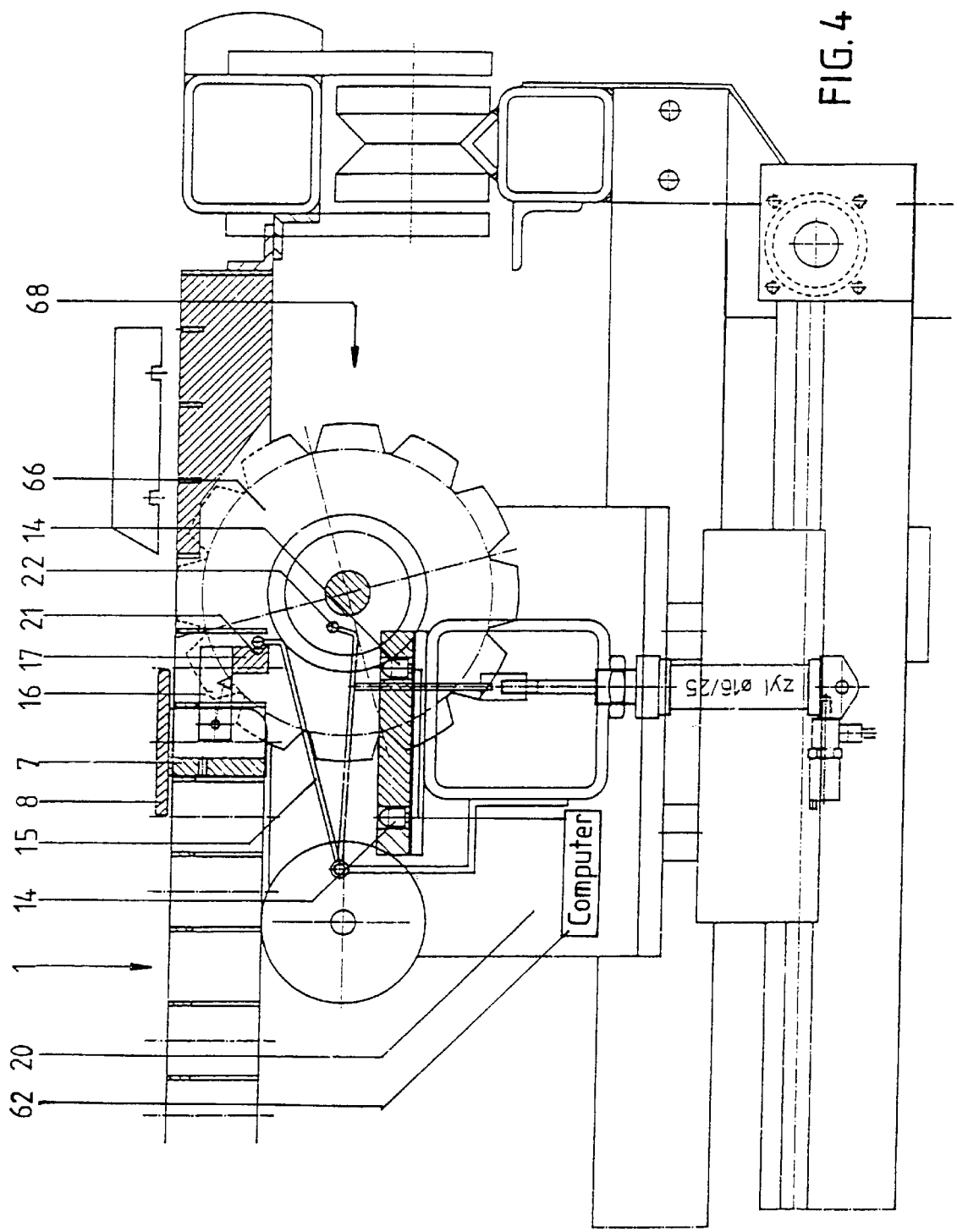
FIG. 4 is a side-elevational view of a measuring carriage with a measuring wheel.
Figure 5:
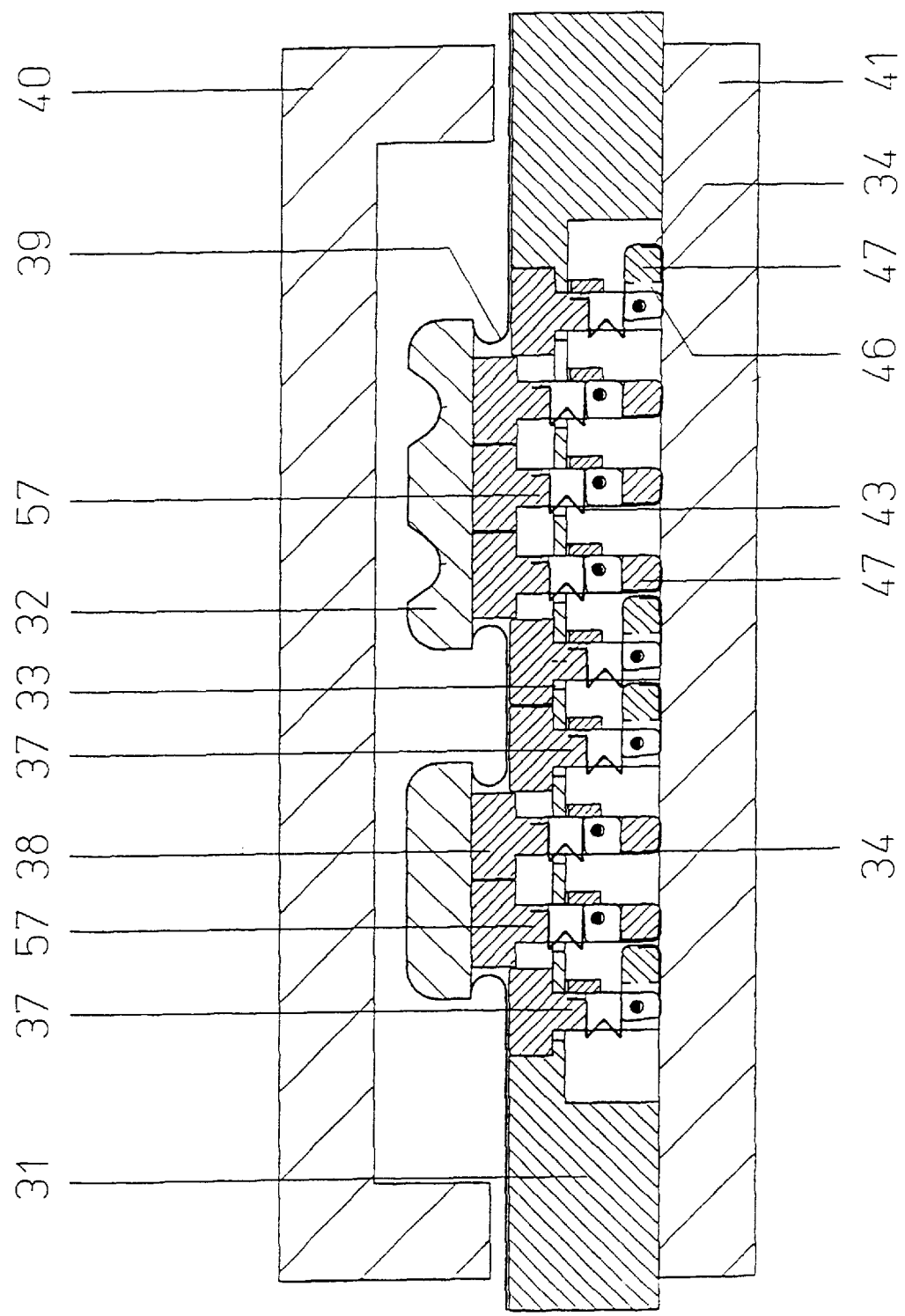
FIG. 5 is a sectional view of a second embodiment showing the work table disposed inside of the press.
Figure 7:
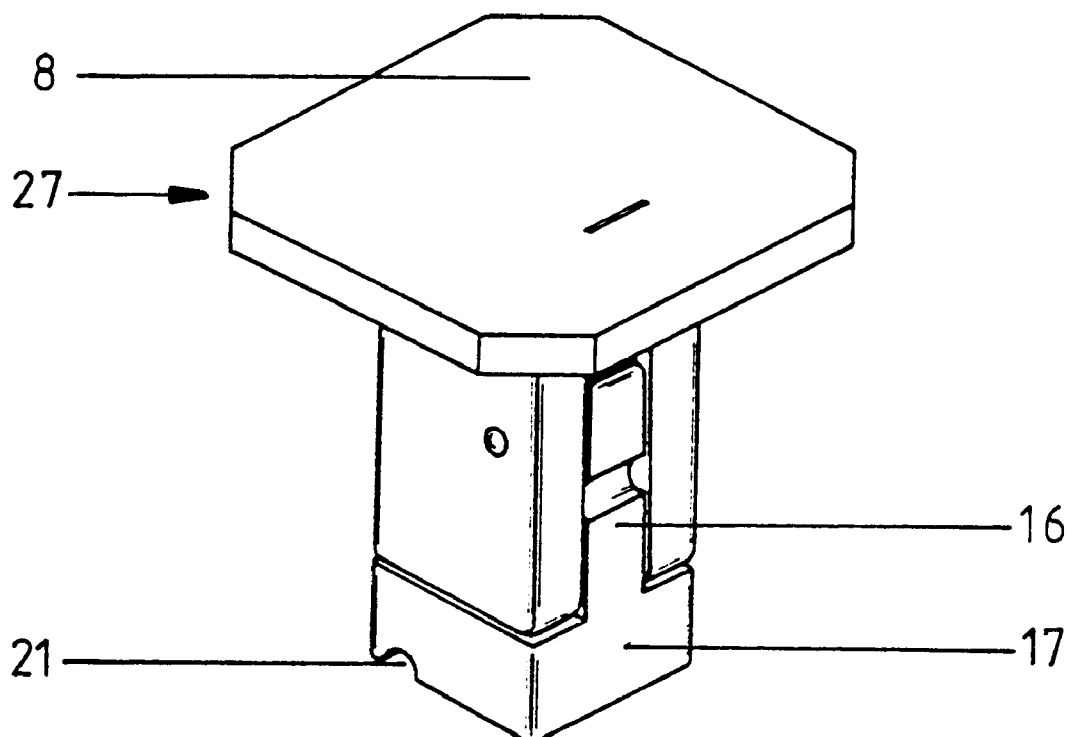
FIGS. 7–10 are perspective views of carrier elements and their respective extension members.
Figure 8:
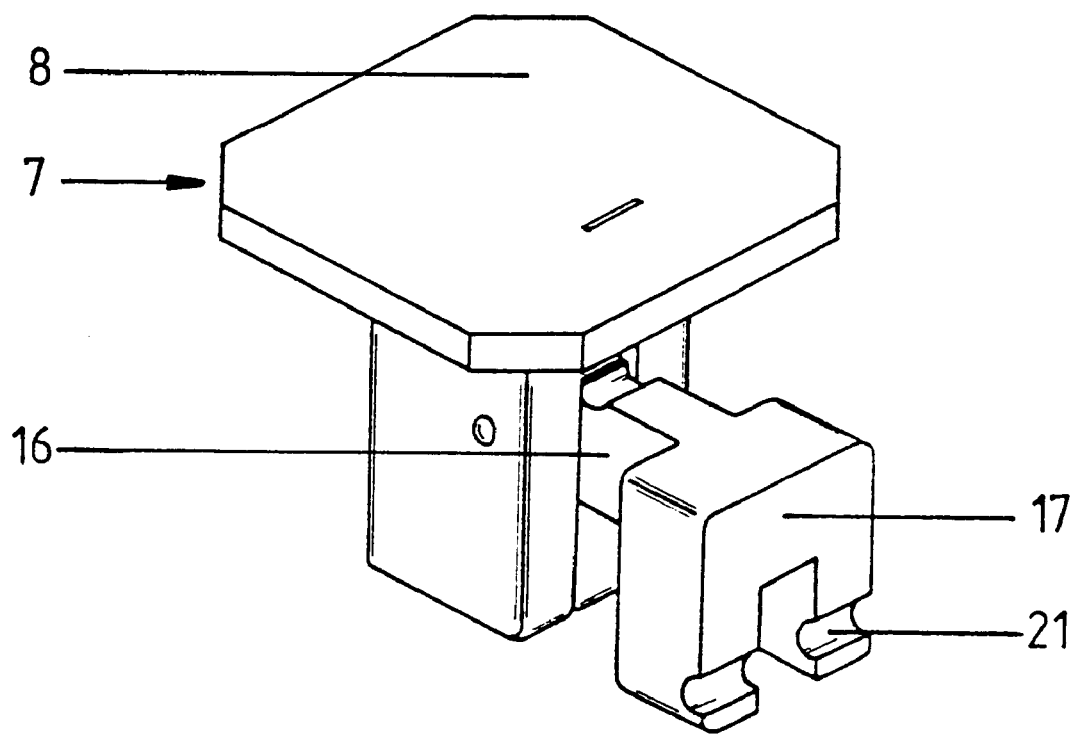
Figure 10:
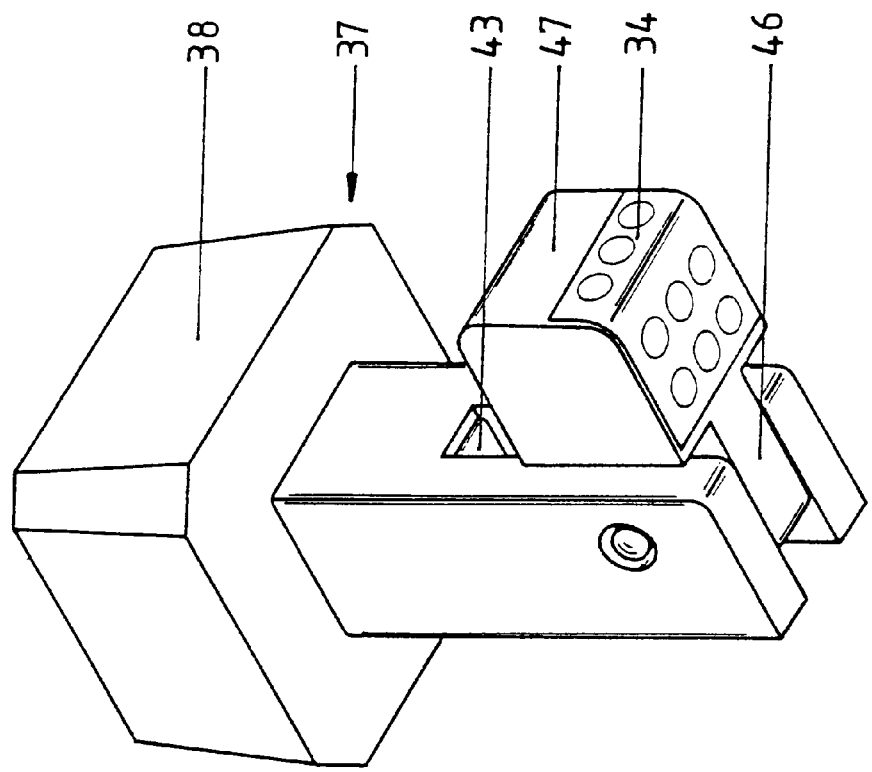
Figure 9:
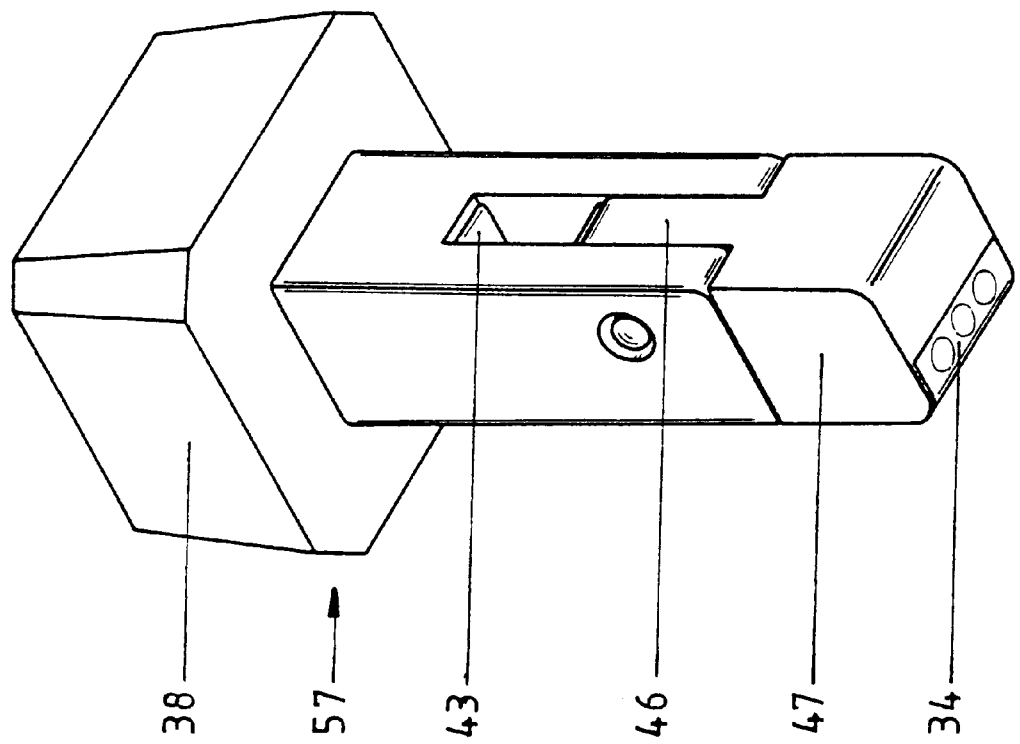

Referring now to the figures of the drawing in detail and first, particularly, to FIGS. 1 and 5 thereof, there is shown a coating press which has a top press plate 10,40 and a bottom press plate 11,41. The top press plate 10,40 and the bottom press plate 11,41 provide a supporting face for the work table 1,31 and for the carrier elements 27,57 extended by the extension member 17,47 (also see FIGS. 7 and 9). The work table 1,31 is introduced into the coating press on a tray carriage 64. In a first embodiment, the work table 1 includes a table plate provided in the form of a grate 4 with through holes 3 (see FIG. 3) and the grate 4 is composed of load members 5 and web members 6. Disposed in each second through hole 3 of the grate 4 are the carrier elements 7,27 (also see FIGS. 8 and 10) which are vertically movable in the through holes 3. The carrier elements 7,27, in a retracted or shortened position, do not extend above the top surface of the table plate or marginally extend above the top surface of the table plate, and when in an extended position, the carrier elements protrude beyond the top surface of the table plate.

Figure 6:
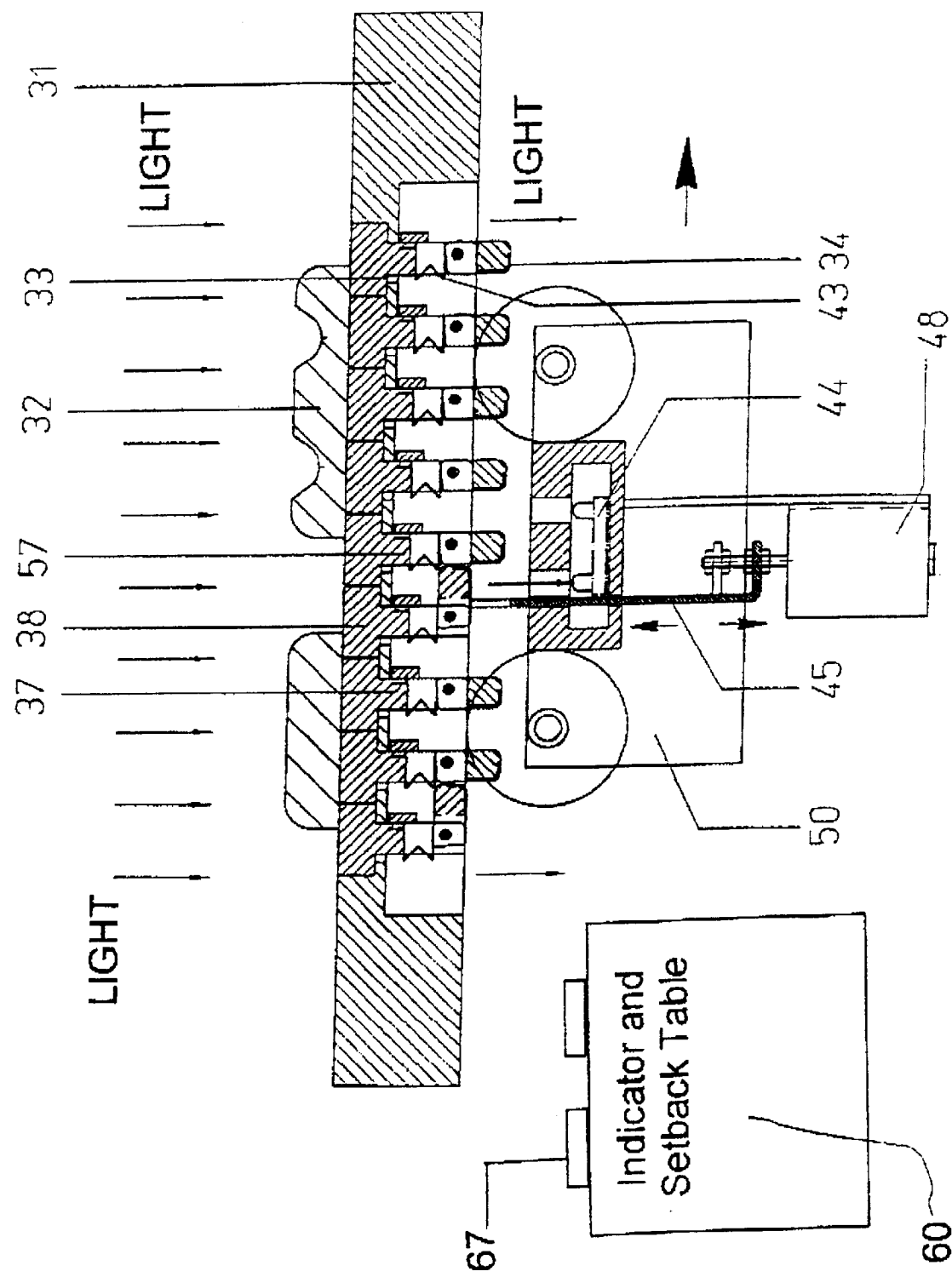
FIG. 6 is a sectional view of the setup station for the second embodiment.

In a second embodiment (FIGS. 5 and 6), the work table 31 includes a table plate with grid-like through holes 33 whose cross-sectional shape substantially conforms to that of the carrier elements 37,57. Each of the carrier elements 37,57 is provided with a lateral groove into which a spring 43 is disposed. The spring 43 protrudes beyond the contour of the carrier element 37,57 and engages the extension member 47 to keep it in its adjusted position. The groove also ensures the correct installation of the carrier elements 37,57 into the work table 31.

The top end of the carrier element 7,27,37,57 is provided with an over-sized carrier plate 8,38 (FIGS. 1 and 5). The underside of the carrier plate rests on the top surface of the grate 4 and/or the work table 1,31 when the carrier element 7,27,37,57 is in the retracted or shortened position or when the work table 1,31 is not disposed in the press. The upper surface of the carrier plates 8,38 provides a large-area support for the flat work pieces to be coated such as furniture boards, furniture doors etc. In addition, the extension member 17,47 is linked to the carrier element 7,27,37,57 through a rocker arm 16,46. The rocker arm 16,46 is swung into a position adjacent the retracted carrier element 7,37 when in a deactivated (retracted) state. The space required for that purpose is made available due to the constructional concept of the grate 4 in the first embodiment which according to usual practice is composed of load members 5 and web members 6. The height of the load members 5 corresponding to that of the grate 4 and the height of the web members 6 disposed in the surface level conforming only to a fraction of the height of the grate 4 so that adequate space is provided for the extension member 17. In the second embodiment, the space availability is ensured via a well-adapted dimensional relationship between the work table 31, the through holes 33, the carrier elements 37,57 and the extension members 47. When a carrier element 7,27,37,57 is in the extended position, the extension member 17,47 is swung in underneath the carrier element 7,27,37,57 in such a way that both parts are in large-area contact and the initial footing face is substantially maintained. Machined into a contact face of the extension member 17 in the first embodiment is a catch in form of an indentation 21 which is adapted to co-act with a nose-shaped catch 22 of a carrier arm 15 of a measuring carriage 20. In the second embodiment, sheet metal strips 34 are disposed in the footing face of the extension member 47. When in the retracted position, the downward directed face of the extension member 47 is adapted to co-act with magnets 67 of an indicator and a setback table 60 disposed underneath the work table 31.

A setup station 61, 68 on the upstream side of the press to which the work table 1,31 loaded with work pieces 2,32 is moved, includes the measuring carriage 20,50 which is disposed under the work table 1,31. The measuring carriage 20,50 is shiftable via a linear unit 65 parallel to the table plate and is fitted with upwardly oriented sensors 14,44. The sensors 14,44 are directed against the uncovered areas through the holes 3 of the grate 4 or the table plate 31, especially against the free areas 19 (FIG. 3) between the corners of any four adjoining carrier plates 8,38 in which the transparent windows 13 or lenses 23 are mounted.

The sensors 14,44 of both exemplary embodiments are light-sensitive photocells reacting to incident light from a light source located above the setup station 61,68. Each loaded work piece 2,32 impedes the light incidence and the condition is recorded by a measuring device such as a computer 62. Non-registration of light incidence by all of the sensors 14,44 surrounding one single carrier plate 8,38 means that this particular carrier plate 8,38 is completely covered up by the work piece 2,32. Therefore, the associated carrier element 8,38 will be or remain extended. When just one of the sensors 14,44 surrounding one of the carrier elements 7,27,37,57 records light incidence, the respective carrier element 7,27,37,57 remains in a retracted position or is retracted from the extended position.

The measuring carriage 20,50 is provided with a lifting cylinder 18,48 which is adapted to act on the carrier arm 15,45. The lifting cylinder 18,48 swings the carrier arm 15,45 from a lowered rest position into a raised position in which according to the first embodiment the catch 22 is enabled to engage into the indentation 21 of an inactive (retracted) extension member 17. Upon advancement of the measuring carriage 20 beneath the table plate, the extension member 17 is carried along and pivots around a pivot point of the rocker arm 16 and swivels into a position forcing the carrier element 7,27 into its extended position. A measuring wheel 66 serves as a position sensor and is adapted to roll along the underside of the table plate.

In the second embodiment, all of the extension members 47 having been brought into an extended position by the magnets 67 in the indicator and setback table 60 are swung into their retracted position by the raised carrier arm 45.

The computer 62 also controls an automatic work piece loading device 63 for loading work pieces onto the work table 1,31.

In a further version not represented in the drawing, the measuring carriage 20,50 may be replaced by a stationary measuring device over which the work table 31 is passed on its way into the press so that any separate setup operation is avoided. After the work table 1,31 has been introduced into the press unit and lowered onto the bottom press plate 11,41, the carrier elements 27,57 extended by the extension members 17,37 are standing on and/or in contact with the press plate 11,41. The carrier elements 27,57 lift the work pieces 2, 32 on the table to a predetermined level such that a coating foil 9 can be pulled over and/or pressed to the surface, the marginal edges and also a small marginal area of the under side of the work pieces 2,32.

We claim:

1. A coating device for multi-face foil coating of work pieces, comprising:
    a work table for receiving work pieces to be coated with a foil, said work table having a table plate with grid-shaped through holes formed therein, said table plate having a top surface;
    a bottom press plate for supporting said work table;
    a tray carriage for receiving said work table and introducing said work table to said bottom press plate; and
    carrier elements having footing faces movably disposed in said through holes, said carrier elements receiving and supporting the work pieces, each of said carrier elements reversibly variable in length between an extended position and a non-extended position, said carrier elements fully covered by the work pieces in said extended position standing on said footing faces on said bottom press plate and extending above said top surface of said table plate for raising the work pieces above a level of said table plate, said carrier elements not covered and partially covered by the work pieces in said non-extended position.

2. The coating device according to claim 1, wherein said carrier elements each have an upper carrier plate with a cross-section larger than a cross section of said through holes, said upper carrier plate has an underside and said underside of said upper carrier plate resides on said top surface of said table plate when said work table is outside of the coating press.

3. The coating device according to claim 2, wherein said upper carrier plate has a square shape with one of rounded and chamfered edges, said carrier elements are disposed in said table plate wherein said upper carrier plate edges are relatively aligned with neighboring upper carrier plates and juxtaposed with play between neighboring upper carrier plates for defining a plane surface having free spaces, said free spaces formed at least in corner areas defined by an intersection of corners of said neighboring carrier plates, said free spaces being uncovered free spaces aligned over said through holes.

4. The coating device according to claim 1, including one of sensors and component parts thereof disposed around said carrier elements and aligned with said free spaces for detecting work pieces lying on said work table, said table plate, and said carrier elements.

5. The coating device according to claim 4, wherein said sensors and said component parts thereof have windows and said windows are disposed in said table plate.

6. The coating device according to claim 1, wherein an extension of said carrier elements from said non-extended position to said extended position can be accomplished manually, semi-automatically and fully automatically.

7. The coating device according to claim 1, including extension members having rocker arms, said rocker arms connected to said carrier elements, each of said extension members is to be swung into a position beneath a thus extended carrier element and a position beside a thus non-extended carrier element.

8. The coating device according to claim 7, including a carrier arm having a catch, and said extension members each having a catch for temporary engagement with said catch of said carrier arm for extending said carrier elements to said extended position.

9. The coating device according to claim 1, wherein said sensors are selected from the group consisting of optical sensors, electrical sensors and mechanical sensors.

10. The coating device according to claim 1, wherein said sensors form a detection system for detecting the work pieces lying on the table plate, said sensors providing signals for causing subsequent extension of said carrier elements in said non-extended position and retracting extended carrier elements to said non-extended position as necessary, said sensors of said detection system are disposed in a sector-wise distribution subdividing said table plate into sections and said detection system controllable on a section by section basis for deactivating chosen sections.

11. The coating device according to claim 1, including a computer connected to said sensors, said computer calculating optimized work piece loading patterns, recognizing actual loading patterns and determining which of said carrier elements need to be put in said extended position.

12. The coating device according to claim 11, including an automatic work piece loading device connected to and controlled by said computer for automatically loading said work table with the work pieces.

13. The coating device according to claim 2, wherein said carrier plates of said carrier elements are thicker than said extension members are high and said carrier plates of said carrier elements are thicker than a lift stroke of said carrier element is long.

14. The coating device according to claim 7, including a setup station having sensors for detecting the work pieces and an actuating device, said setup station disposed underneath said tray carriage, said sensors having sensor windows disposed on one of said table plate and said carrier elements, said actuating device movable underneath said tray carriage in parallel relation to said tray carriage and said actuating device having a carrier arm and a positioning device, said carrier arm is to be adjusted by said positioning device, said carrier arm engaging and swinging said extension members linked to said carrier elements through said rocker arms to beneath said carrier elements for putting said carrier elements in said extended position when a work piece is fully covering up a respective one of said carrier elements.

15. The coating device according to claim 14, wherein said actuating device has a forward portion and a rear portion, said carrier arm is disposed in said forward portion and extends towards said rear portion, said carrier arm has an end with an upwardly directed catch, said positioning device is a lifting cylinder connected to said carrier arm, said carrier arm having said catch is movable from a lower position to a level of said extension members for a short-time engagement of said catch with said extension members for swinging said extension members downward from a lateral rest position during advancement of said actuating device to said extension members.

16. The coating device according to claim 14, wherein said setup system has a measuring carriage with a measuring wheel and a linear unit, said actuating device is disposed on said measuring carriage, said measuring carriage is to be shifted on said linear unit, said measuring wheel has a circumferential shape adapted to a shape of an underside of said table plate, said actuating device equipped with said sensors for detecting table plate sections not loaded with the work pieces, said sensors detecting the works pieces on said table plate sections by one of simultaneously analysis and successive analysis of said table plate sections.

17. The coating device according to claim 8, wherein said catch of said of said carrier arm is formed of magnets and magnetic material.

18. The coating device according to claim 17, wherein said extension members each have a plate strip disposed in an area of said footing faces, and said footing faces are directed downward if said extension members are in said non-extended position.

19. The coating device according to claim 17, including a vertically and laterally shiftable indicator and setback table disposed underneath said work table, said indicator and setback table having column-disposed magnets with free interim spaces for supporting said extension members of extended carrier elements.

20. The coating device according to claim 17, including a measuring device having sensors and a lifting cylinder, said carrier arm disposed in said measuring device behind said sensors as viewed in a direction of movement of said carrier arm, said carrier arm connected to said lifting cylinder, said measuring device and said work table movable relative to each other, said lifting cylinder lifting said carrier arm to a position adjacent a rear side of said extension members for turning over sideways said extension members in said extended position to said non-extended position during a relative movement of said measuring device.

21. The coating device according to claim 1, wherein said carrier elements are configured as one-piece carrier elements each having at least two support faces, each of said at least two support faces to be selectively aligned to be parallel with said top surface of said table plate, said carrier elements protruding beyond said top surface of said table plate in at least one of said selected alignments.

22. The coating device according to claim 21, wherein said carrier elements have at least four parallel faces configured in pairs and disposed with different spacings from each other, and anyone of said at least four parallel faces to be alternatingly brought into parallel alignment with said top surface of said table plate.

23. The coating device according to claim 22, wherein said carrier elements are parallelepiped shaped.

24. The coating device according to claim 21, wherein said carrier element is to be swung about a pivot differently spaced from said support faces.

25. The coating device according to claim 1, including a blower disposed below the work table for creating air underpressure below the work pieces.

26. The coating device according to claim 1, including a blower disposed above the work table for creating air overpressure above the work pieces.

\* \* \* \* \*